(12) United States Patent
Munsell et al.

(10) Patent No.: US 10,839,983 B2
(45) Date of Patent: Nov. 17, 2020

(54) RODENT REPELLENT ELECTRICAL CABLE

(71) Applicant: STICK-IN-THE-MUD, LLC, Chula Vista, CA (US)

(72) Inventors: Clyde Stephan Munsell, Chula Vista, CA (US); James Dalgleish Reid, San Diego, CA (US); Richard William Hanawalt, Ventura, CA (US)

(73) Assignee: STICK-IN-THE-MUD, LLC, Chula Vista, CA (US)

( * ) Notice: Subject to any disclaimer, the term of this patent is extended or adjusted under 35 U.S.C. 154(b) by 0 days.

(21) Appl. No.: 16/669,341

(22) Filed: Oct. 30, 2019

(65) Prior Publication Data

US 2020/0135362 A1   Apr. 30, 2020

Related U.S. Application Data

(60) Provisional application No. 62/753,287, filed on Oct. 31, 2018.

(51) Int. Cl.
| | |
|---|---|
| *A01N 31/06* | (2006.01) |
| *H01B 7/18* | (2006.01) |
| *H01B 13/22* | (2006.01) |
| *G02B 6/44* | (2006.01) |
| *H01B 13/00* | (2006.01) |

(52) U.S. Cl.
CPC ........... *H01B 7/1805* (2013.01); *A01N 31/06* (2013.01); *G02B 6/4432* (2013.01); *H01B 13/002* (2013.01); *H01B 13/227* (2013.01)

(58) Field of Classification Search
CPC ............. H01L 37/1805; H01L 313/002; H01L 313/227; A01N 31/06; G02B 6/4432

USPC ....................................................... 174/70 R
See application file for complete search history.

(56) References Cited

U.S. PATENT DOCUMENTS

| | | | | |
|---|---|---|---|---|
| 1,520,680 | A * | 12/1924 | Abbott ...................... | H01B 7/02 174/117 R |
| 2,222,638 | A * | 11/1940 | Szilard ..................... | H01B 7/28 174/116 |
| 2,351,589 | A * | 6/1944 | Abbott .................. | H01B 13/26 57/7 |
| 2,536,885 | A * | 1/1951 | Olson ...................... | H01B 7/18 156/54 |

(Continued)

*Primary Examiner* — Timothy J Thompson
*Assistant Examiner* — Michael F McAllister
(74) *Attorney, Agent, or Firm* — US IP Attorneys, P.C.; Timothy Marc Shropshire

(57) ABSTRACT

A rodent repellent cable has an outer protective jacket for housing the cable's internal components. The internal components include at least a means for facilitating transmission of electrical current or data, and a repellent bonded to at least one component of the cable. The means for facilitating transmission of electrical current or data include, but are not limited to, wires and optical fibers. The cable may include additional internal components, such as one or more separators and a sheath. The repellent is configured to repel rodents, based on a negative olfactory stimulus when the rodents are subjected to the repellent. This will deter rodents from chewing on wire or cable containing the repellent, which will significantly reduce the incidence of fires of undetermined origin and rodent-inflicted damage to wiring systems universally.

9 Claims, 7 Drawing Sheets

(56) References Cited

U.S. PATENT DOCUMENTS

| | | | | | |
|---|---|---|---|---|---|
| 2,856,453 | A | * | 10/1958 | Shepp | H01B 7/1855 |
| | | | | | 174/116 |
| 4,171,463 | A | * | 10/1979 | Watkins | H01B 7/282 |
| | | | | | 174/120 R |
| 4,847,151 | A | * | 7/1989 | Ichiro | A01N 25/10 |
| | | | | | 428/389 |
| 5,280,137 | A | * | 1/1994 | Ward | H01B 7/187 |
| | | | | | 174/110 V |
| 5,993,966 | A | * | 11/1999 | Johnson | D02G 3/44 |
| | | | | | 424/412 |
| 7,287,489 | B1 | * | 10/2007 | O'Brien | A01K 15/02 |
| | | | | | 119/712 |
| 8,734,819 | B2 | * | 5/2014 | Dussich, Jr. | A01N 65/28 |
| | | | | | 424/403 |
| 8,940,767 | B2 | * | 1/2015 | Numata | A01N 25/24 |
| | | | | | 514/321 |
| 9,271,486 | B2 | * | 3/2016 | Messina | A01N 25/00 |
| 10,100,180 | B2 | * | 10/2018 | Dussich | C08L 23/06 |
| 2010/0260872 | A1 | * | 10/2010 | Dussich, Jr. | A01N 65/22 |
| | | | | | 424/742 |

* cited by examiner

RODENT REPELLENT ELECTRICAL CABLE

CROSS-REFERENCE TO RELATED APPLICATION(S)

This application claims benefit of U.S. Provisional Patent Application No. 62/753,287 filed Oct. 31, 2018, entitled, "RAT REPELLENT SYSTEM", the entire disclosure of which is incorporated by reference herein.

BACKGROUND OF THE INVENTION

1. Field of Invention

The present invention relates to the field of electrical and other wiring infrastructure systems and animal repelling devices. More specifically, the present invention relates to wiring systems for repelling rodents, and methods of manufacturing same.

2. Description of Related Art

Rodents and similar small mammals are often found inhabiting areas also populated by people. Homes, vehicles, and other man-made structures provide opportunity for rodents to live and flourish, eventually progressing to the level of infestation. Even a single rodent can create catastrophic issues, such as spreading disease and inflicting or causing damage to structures, vehicles, and other items.

One specific example of such damage relates to electrical systems. Electrical wiring and electrical conduit generate heat, resulting from the flow of electricity therethrough. While rodents are warm blooded, they are sensitive to decreases in temperature. As a result, rodents are instinctually drawn to heat-producing wires, e.g., electrical wires, as a means to augment their body temperature with heat from the wires. Oftentimes, rodents will chew wires, causing power outages or fires, and/or presenting a dangerous potential for contact with exposed live wires. It has been postulated that a trend of transitioning from petroleum-based cable components, e.g., jacketing and primary insulation applied directly onto conductors, to more plant-based biodegradable materials, in an effort to reduce waste, has resulted in an increased incidence of rodent-inflicted wire damage, as rodents are supplementing their diets with the plant-based components as a food source.

Twenty percent (20%) of fires of undetermined origin are attributed to short circuits caused by rats chewing on the insulation of electrical wiring. Additionally, rodent-inflicted damage to car wiring systems is becoming increasingly prevalent, which, as discussed above, is attributable to automakers switching to more plant-based biodegradable materials in an effort to reduce waste. While efforts, such as jacketing wire with metal conduit, or the like, have been made to shield wire from rodents, the current materials of electrical wiring and electrical wiring insulation are not designed to repel rats.

Pest control currently involves measures taken after an infestation or problem is discovered. Companies currently offer services to remove rodents from an area through use of chemical or mechanical devices. For example, traps are commonly used to curtail rodent infestation. Typically, traps are set only after a rodent is discovered. However, one noticeable issue with traps is that they are limited in the quantity of rodents they can address. Additionally, they must be reset once triggered. And, yet further, traps are typically designed to kill rodents, which many view as inhumane. While these types of treatment may be effective to address smaller-scale, existing rodent issues, they do not proactively prevent inhabitation or reoccurrence of infestation.

Poisons are also commonly used to kill rodents. Rat poison is a common and generic term for an anti-coagulant composition designed to cause fatal internal bleeding in the rodent after consumption. Just as with other treatments, such as snap-style traps that are designed to kill rodents, poisons are viewed by many to be inhumane. Further, the effect of poison compositions is indiscriminate, i.e., they have a similar detrimental (and potentially lethal) effect on humans—especially young children—or domesticated animals, if consumed.

Visual acuity of rodents is very poor. To compensate, they use their olfactory system as a means for navigation. Rodents' olfactory systems are adversely affected by certain substances. For example, a rat's olfactory system is acutely and negatively affected by menthol. Rat's olfactory cells act as receptors to atomic or molecular interaction with menthol. Exposure to menthol causes rats to experience the "freezing" sensation humans can similarly experience when exposed to concentrated menthol. This is a devastating effect for a rat, since it relies so heavily on its sense of smell for navigation.

Research studies have shown that menthol is naturally attracted, and binds, to copper to form a coating on its surface. Among other things, the menthol coating acts as a protective barrier to protect copper in acidic environments.

Based on the foregoing, clear deficiencies exist in prior art pest control systems' ability to proactively prevent inhabitation or reoccurrence of infestation or address a large number of rodents. Further, current treatments may be viewed as inhumane and present potential adverse side effects and health concerns to humans and domesticated animals. Therefore, there is a need in the art for a wiring system that contains a non-toxic repellent for repelling rodents from homes, vehicles, and other structures, items, or areas containing wire or cable.

SUMMARY OF THE INVENTION

A rodent repellent cable includes, but is not limited to, an outer jacket, a transmission means for facilitating transmission of electrical current or data, and a repellent bonded to at least one component of the cable. The transmission means extend longitudinally through a hollow interior of the cable, the hollow interior being defined by an interior wall of the jacket.

In an embodiment, the transmission means includes at least one or more conductive wires. In a further embodiment, the one or more conductive wires include at least a copper wire. In yet a further embodiment, the repellent includes at least menthol.

In an embodiment, the cable includes a separator disposed around at least one of the one or more conductive wires. In a further embodiment, the separator is constructed of paper.

In an embodiment, the transmission means includes at least one or more fibers. In a further embodiment, the one or more fibers are non-conductive. In yet a further embodiment, the one or more fibers are optical fibers.

In an embodiment, the cable includes a separator disposed between the jacket and at least one of the one or more fibers. In a further embodiment, the separator is constructed of aramid yarn.

In an embodiment, the repellent is configured to repel rodents, based on a negative olfactory stimulus when the rodents are subjected to the repellent. In an embodiment, the repellent includes at least menthol.

In an embodiment, the cable includes a sheath disposed between the jacket and the transmission means. In a further embodiment, the sheath is constructed of paper.

In an embodiment, a method of manufacturing the rat repellent cable includes the steps of introducing a repellent to one or more components of the cable and adding a jacket around one or more internal components of the cable, such that the one or more internal components are disposed within a hollow interior of the cable defined by an interior wall of the jacket. In an embodiment, the repellent is menthol.

In an embodiment, prior to adding the jacket around one or more internal components of the cable, the method also includes the step of wrapping at least one transmission means in a separator treated with the repellent.

In an embodiment, prior to adding the jacket around one or more internal components of the cable, the method also includes the step of wrapping an assembly of internal cable components in a sheath treated with the repellent.

In an embodiment, prior to adding the jacket around one or more internal components of the cable, the method also includes the step of passing an assembly of internal cable components through a cooling apparatus to cool the assembly to a pre-determined temperature.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
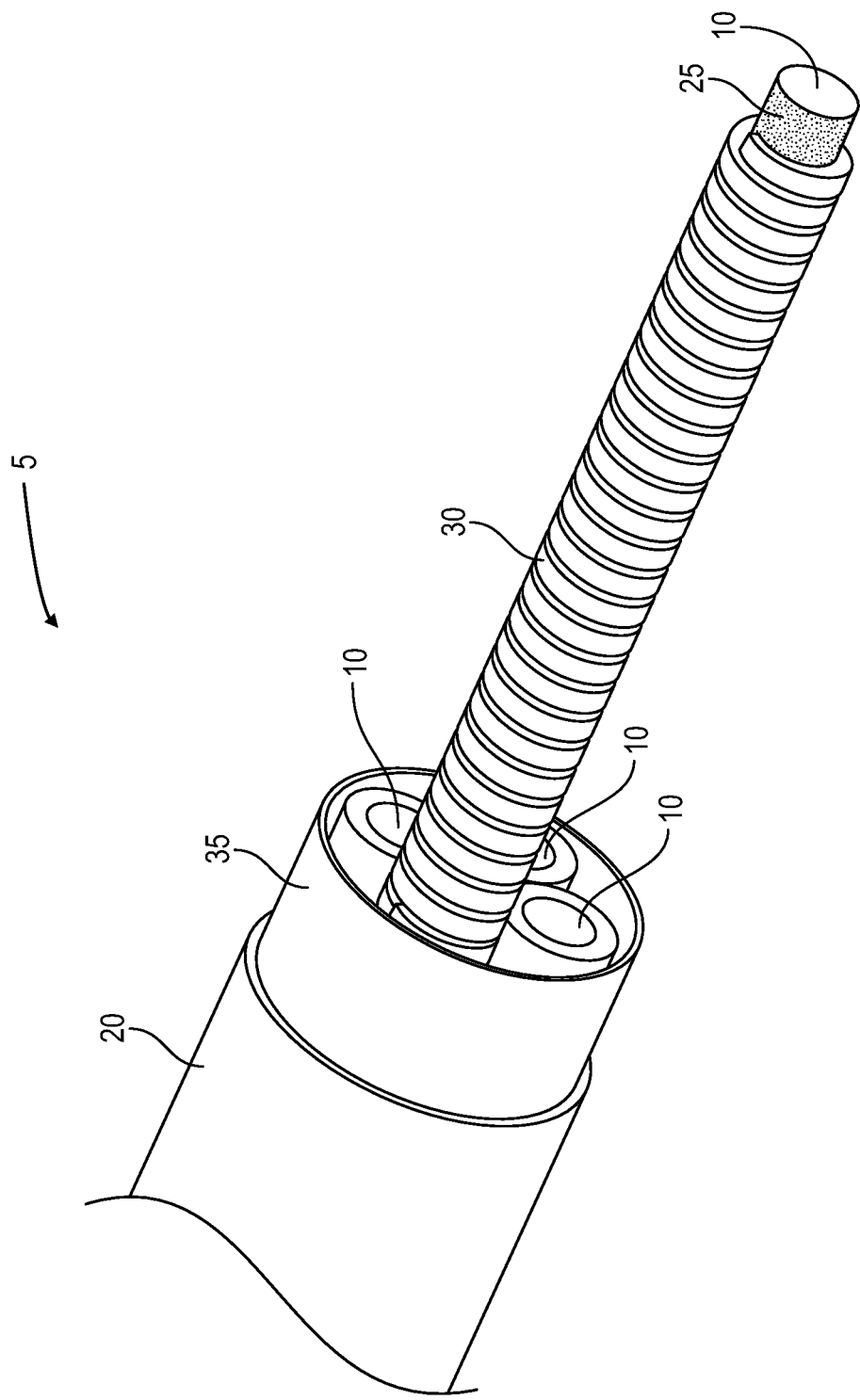
FIG. 1 illustrates a partial perspective cutaway view of the rodent repellent cable, according to an embodiment of the present invention.
Figure 2:
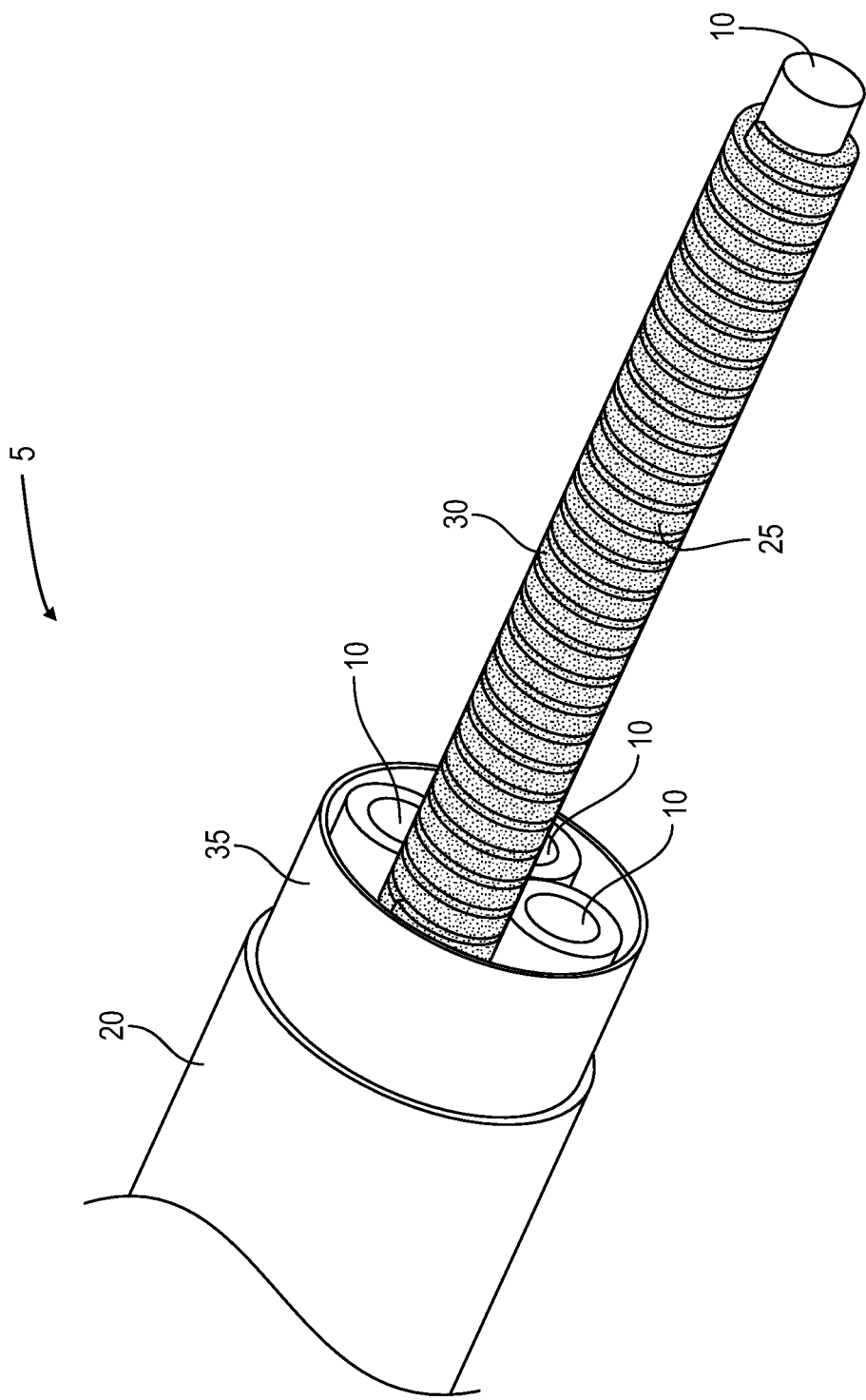
FIG. 2 illustrates a partial perspective cutaway view of the rodent repellent cable, according to an embodiment of the present invention.
Figure 3:
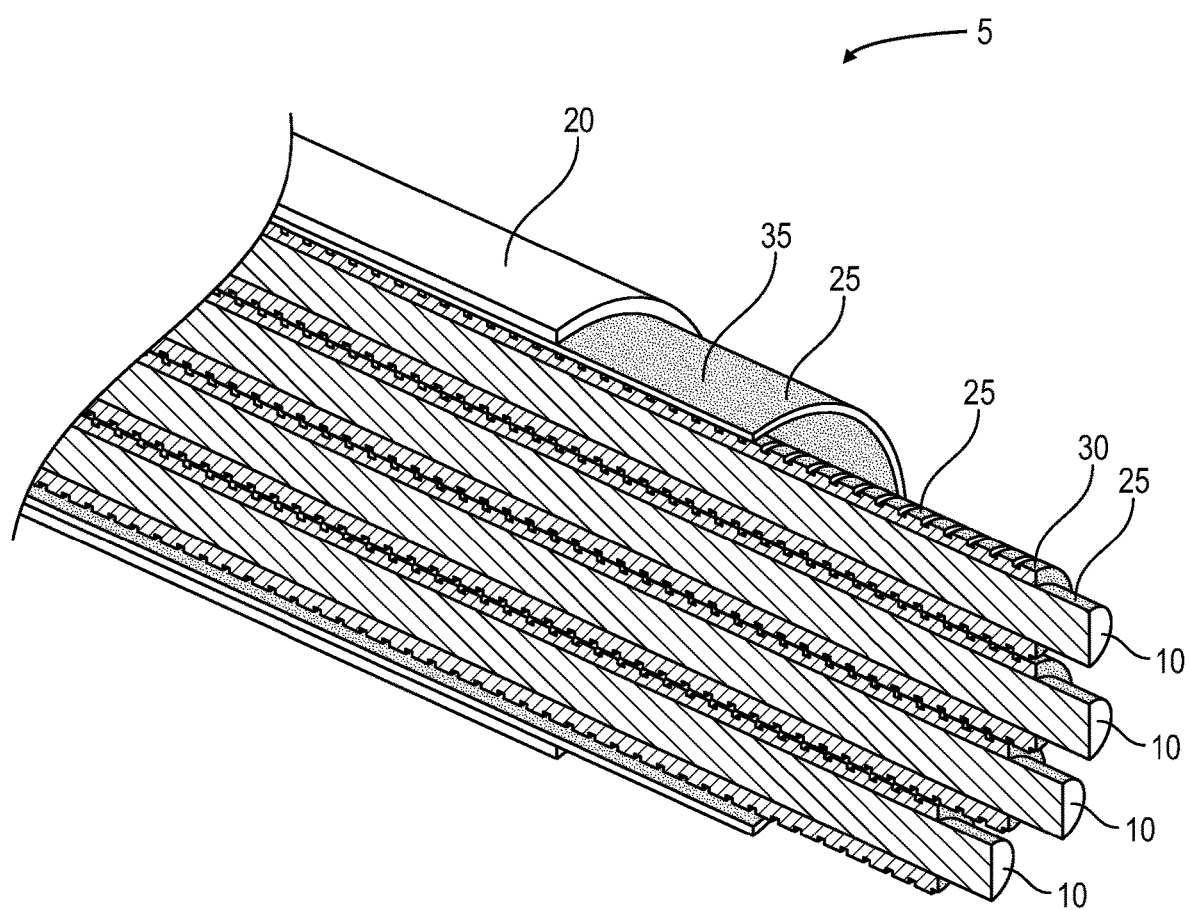
FIG. 3 illustrates a partial perspective cutaway view of the rodent repellent cable, according to an embodiment of the present invention.
Figure 4:
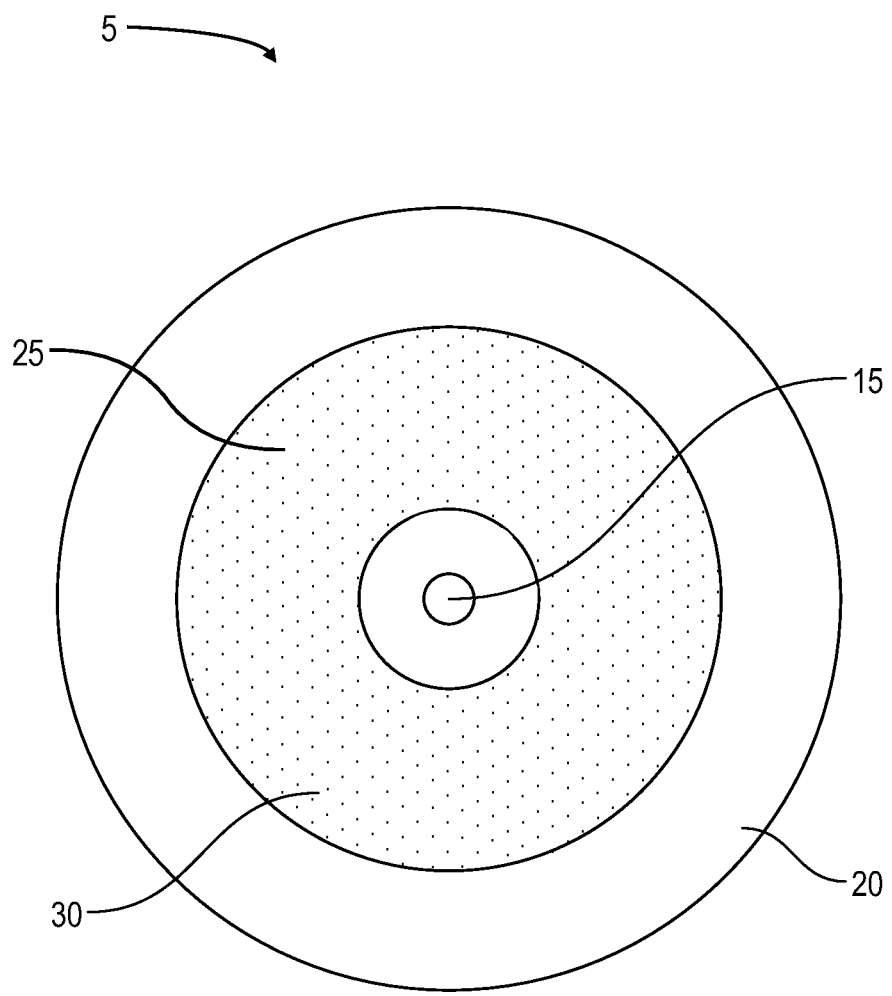
FIG. 4 illustrates a cross-sectional view of the rodent repellent cable, according to an embodiment of the present invention.

Preferred embodiments of the present invention and their advantages may be understood by referring to FIGS. 1-7, wherein like reference numerals refer to like elements.

With reference to FIGS. 1-4, rat repellent cable 5 includes one or more wires 10 or one or more fibers 15 disposed within a hollow interior portion of cable 5 defined by the inner wall of outer protective jacket 20. Wire 10 may be any conductive wire for facilitating the transmission of electrical power, electrical signals, telecommunication signals, etc. Additionally, one or more of wires 10 may be insulated. Fibers 15 may be any non-conductive material, e.g., glass (silica) or plastic, for facilitating the transmission of data for telecommunications, computer networking, etc. Repellent 25 is adsorbed, adhered, or otherwise bonded to at least one component of cable 5. Repellent 25 is preferably any substance that repels rodents, based on a negative olfactory stimulus when the rodents are subjected to repellent 25. Connectors (not shown) may be coupled to the ends of cable 5 for facilitating connection to systems, devices, etc.

In an embodiment, at least one wire 10 or fiber 15 is wrapped in, or otherwise surrounded by, one or more separators 30. Separator 30 is constructed of a non-conductive material, such as paper or aramid fiber/yarn, and may be used for a number of reasons, including, but not limited to, insulating the wrapped wire 10 or fiber 15 from other components within jacket 20 and/or providing structural support, protection, and tensile strength to cable 5.

Separator 30 may be embodied in a number of ways. For example, separator 30 may be a tubular member for housing fibers 15. As another example, separator 30 may be one or more strips of material that is folded, rolled, or bundled lengthwise to surround wire 10, fiber 15, or other component surrounding wire 10 or fiber 15. As yet another example, separator 30 may be a spiral wrapping, whereby, in use, separator 30 is wrapped around wire 10 or fiber 15 in a spiral fashion.

In an embodiment, sheath 35 is disposed within jacket 20 and surrounds an assembly of cable's internal components, e.g., wires 10 or fibers 15 and, optionally, separator 30. Sheath 35 is preferably, but not necessarily, constructed of a non-conductive material, such as paper or aramid fiber/yarn.

In an embodiment, repellent 25 is menthol. Menthol is a non-toxic substance, i.e., it is not known to be lethal, or otherwise detrimental to the health and safety of humans and/or animals. This is important, as it would ensure that the pests are not harmed, killed, or otherwise dealt with in an inhumane manner. Additionally, it would ensure the safety of young children, domesticated animals and individuals charged with the removal, disposal, and/or recycling of the wire at the end of its service life.

Figure 5:
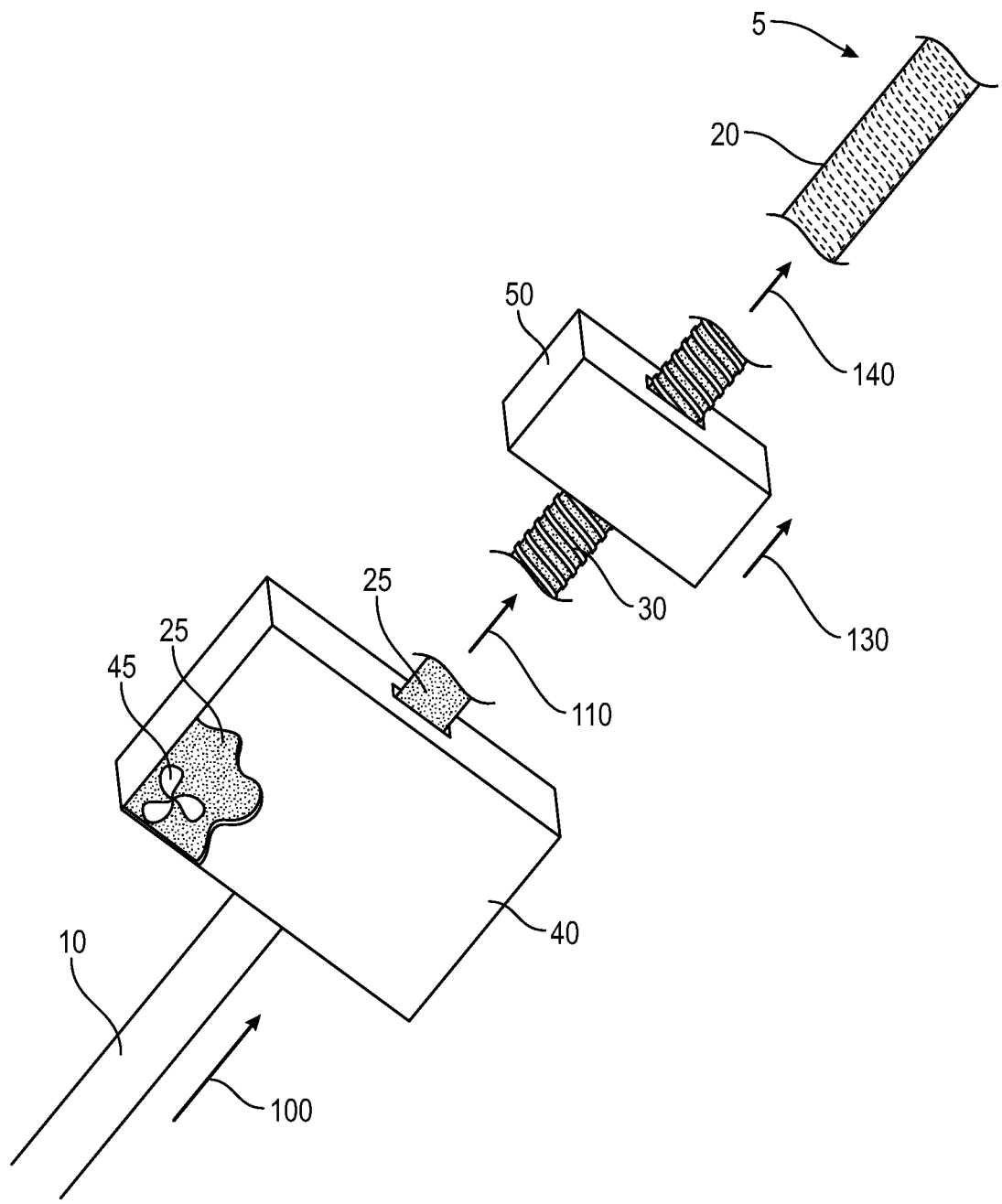
FIG. 5 illustrates a system for manufacturing the rodent repellent cable, according to an embodiment of the present invention.
Figure 6:
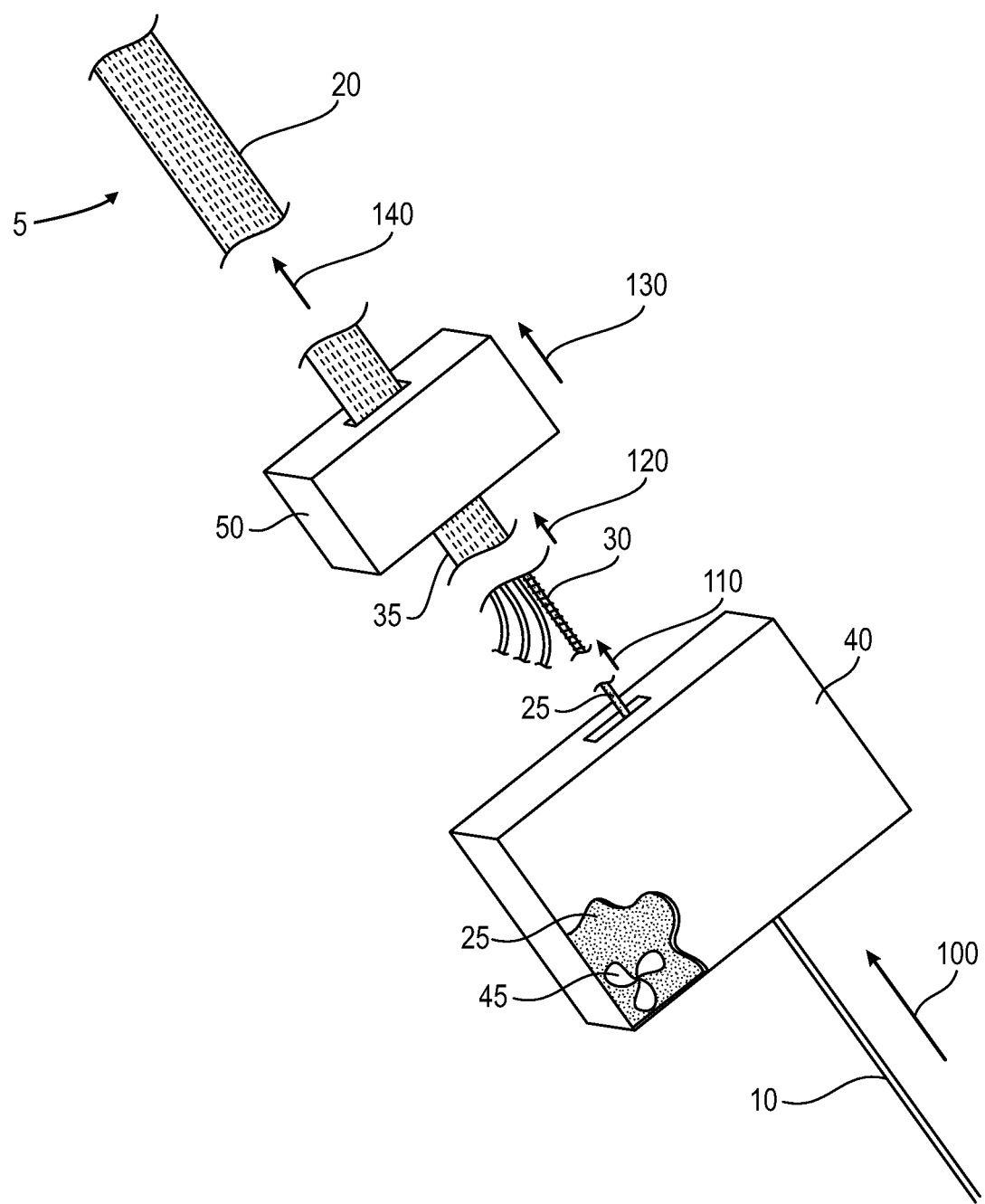
FIG. 6 illustrates a system for manufacturing the rodent repellent cable, according to an embodiment of the present invention.
Figure 7:
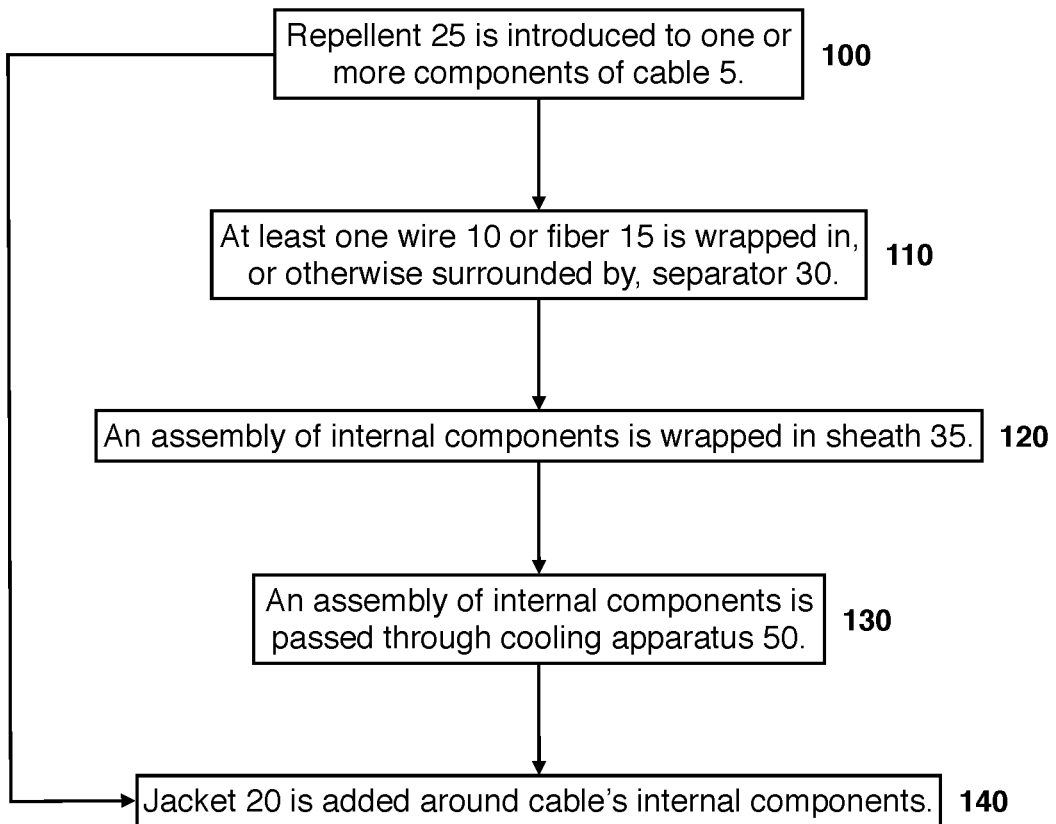
FIG. 7 is a flow chart showing a method of manufacturing the rodent repellent cable, according to an embodiment of the present invention.

FIGS. 5-7 show example systems and methods of manufacturing the rodent repellent cable. At step 100, repellent 25 is introduced to one or more components of cable 5. This is accomplished a number of ways, including, but not limited to: passing the components through vaporized repellent 25; spraying liquid repellent 25 onto the components or immersing the components in liquid repellent 25 and allowing the components to dry; or passing the components through a suspension of repellent particulate 25, whereby repellent 25 binds to the components through the assistance of an additive, e.g., an adhesive, and/or an electrostatic bond. Repellent 25 may be prepared in solution through generally understood means such as dissolving solid repellent 25, e.g., menthol in crystalline form, in solvents, e.g., propylene glycol, or converting solid repellent 25 into a liquid by heating solid repellent 25. Following is a non-exhaustive list of examples of the process of binding repellent 25 to the components of cable 5.

Example 1

Agitator 40 has one or more air handlers 45, such as fans or air hoses (the hoses being connected to pressurized air sources, e.g., an air compressor), for circulating air within agitator 40. Repellent 25 is added to agitator 40, whereby the circulating air is configured to maintain suspension of repellent 25 within agitator 40. As wire 10 is passed into and through agitator 40, suspended repellent 25 binds to wire 10. Binding of dry repellent to wire 10 may be naturally facilitated, e.g., by static electricity. The binding effect may be enhanced by addition of an electrical charge to wire 10. In some cases, repellent 25 will naturally adsorb to wire 10. For example, as discussed above, when exposed to copper, menthol naturally adsorbs, i.e., binds, to the copper to form a coating thereon.

Example 2

Separator 30 and/or sheath 35 is passed through, or positioned within, agitator 40. Prior to entering agitator 40 or while in agitator 40, separator 30 and/or sheath 35 may be moistened with a solvent, e.g., with propylene glycol, or prepped with an adhesive or other bonding agent to facilitate attachment of atomized, suspended repellent 25 within agitator 40. A sprayer or other means (not shown) may be employed to moisten or prep separator 30 and/or sheath 35 with adhesive or other bonding agent.

Example 3

An electrical current may be applied to wire 10 and repellent 25 to create opposing electrical charges to promote bonding between wire 10 and repellent 25. As seen in electroplating or powder coating, the opposing electrical charges create an attraction between wire 10 and repellent 25, whereby repellent 25 binds to wire 10 to form a coating thereon.

Example 4

Repellent 25 may be vaporized, whereby one or more cable components are passed through the resulting vapor. As the vapor condenses and dries, repellent 25 adsorbs, adheres, or otherwise binds to the components.

Optionally, at step 110, at least one wire 10, fiber 15, or other component surrounding the at least one wire 10 or fiber 15 is wrapped in, or otherwise surrounded by, separator 30. In an embodiment, wire 10 wrapped in separator 30 is an uninsulated wire 10, e.g., a bare copper wire.

Optionally, at step 120, an assembly of internal components, including, but not limited to, wires 10 or fibers 15 and, optionally, separator 30, is wrapped in sheath 35.

Optionally, at step 130, the assembly of internal components, with or without sheath 35, is passed through cooling apparatus 50 to cool the components to a pre-determined temperature. This is done to avoid loss of repellent 25, due to vaporization during the jacketing process. Hence, the pre-determined temperature is calculated based on the boiling point, i.e., vaporization temperature, of repellent 25, the initial temperature of repellent 25, the specific heat capacity of repellent 25, the jacketing temperature, and the length of time repellent 25 is exposed to the jacketing temperature. If the boiling point of repellent 25 is higher than the temperature of the jacketing process, use of cooling apparatus 50 is not necessary. If, however, the boiling point of repellent 25 is lower than the temperature of the jacketing process, cooling apparatus 50 may be used to lower the temperature of repellent 25 to a pre-determined temperature such that the temperature of repellent 25 does not reach the point of vaporization during the jacketing process.

At step 140, jacket 20 is added, whereby the cable's internal component(s), including, but not limited to, wire(s) 10 or fiber(s) 15, and, optionally, separator 30 and/or sheath 35, are disposed within cable's hollow interior. One skilled in the art would understand and appreciate that application of jacket 20 could be accomplished in a number of ways known in the art.

While the foregoing method is described and shown in a numerical, step-wise order, it should be understood that the steps are not limited to any specific order. Additionally, some steps may overlap in time, i.e., they may be carried out simultaneously, with other steps.

The invention has been described herein using specific embodiments for the purposes of illustration only. It will be readily apparent to one of ordinary skill in the art, however, that the principles of the invention can be embodied in other ways. Likewise, it will be readily apparent that the features, functions, and/or elements of the present invention disclosed herein can be used in any combination to produce various embodiments of the present invention. Therefore, the invention should not be regarded as being limited in scope to the specific embodiments disclosed herein, but instead as being fully commensurate in scope with the following claims.

We claim:

1. A rodent repellent cable comprising:
   a. a jacket;
   b. transmission means for facilitating transmission of electrical current or data, the transmission means extending longitudinally through a hollow interior of the cable, the hollow interior being defined by an interior wall of the jacket; and
   c. a repellent electrostatically bonded to at least one component of the cable, wherein the repellent is an olfactory stimulant configured to repel rodents.

2. The cable of claim 1, wherein the transmission means comprises one or more conductive wires.

3. The cable of claim 2, wherein the one or more conductive wires comprise a copper wire.

4. The cable of claim 3, wherein the repellent is menthol.

5. The cable of claim 2, further comprising a separator disposed around at least one of the one or more conductive wires.

6. The cable of claim 5, wherein the separator is constructed of paper.

7. The cable of claim 1, wherein the repellent is menthol.

8. The cable of claim 1, further comprising a sheath disposed between the jacket and the transmission means.

9. The cable of claim 8, wherein the sheath is constructed of paper.

* * * * *